F. LOJACONO.
SUGAR CANE PLANTER.
APPLICATION FILED NOV. 9, 1910.
1,000,529.
Patented Aug. 15, 1911.
4 SHEETS—SHEET 2.
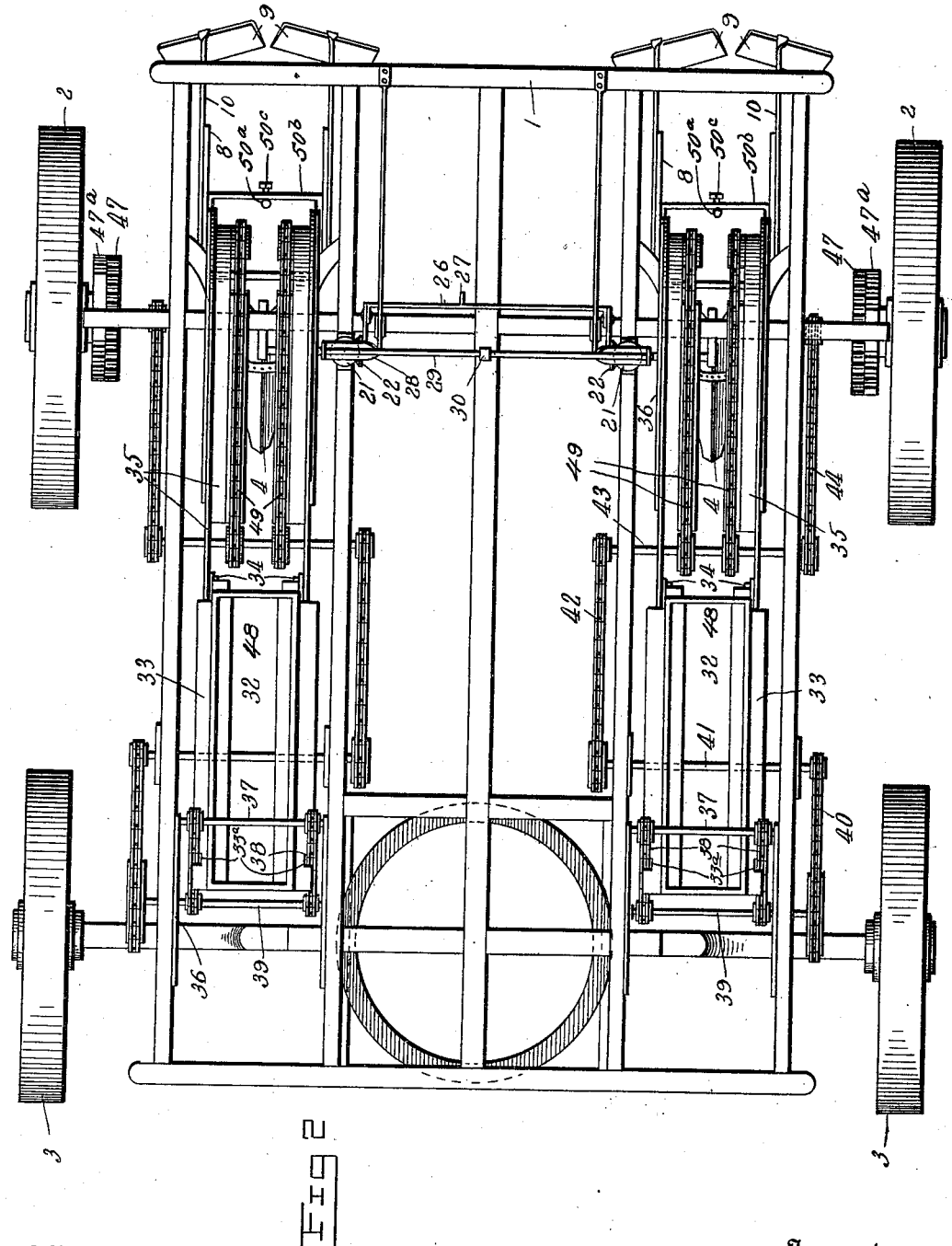
Witnesses
H. C. Robinett
E. J. Manson
Inventor
Francisco Lojacono
by G. Ayres
Attorney F. LOJACONO.
SUGAR CANE PLANTER.
APPLICATION FILED NOV. 9, 1910.
1,000,529.
Patented Aug. 15, 1911.
4 SHEETS—SHEET 3.
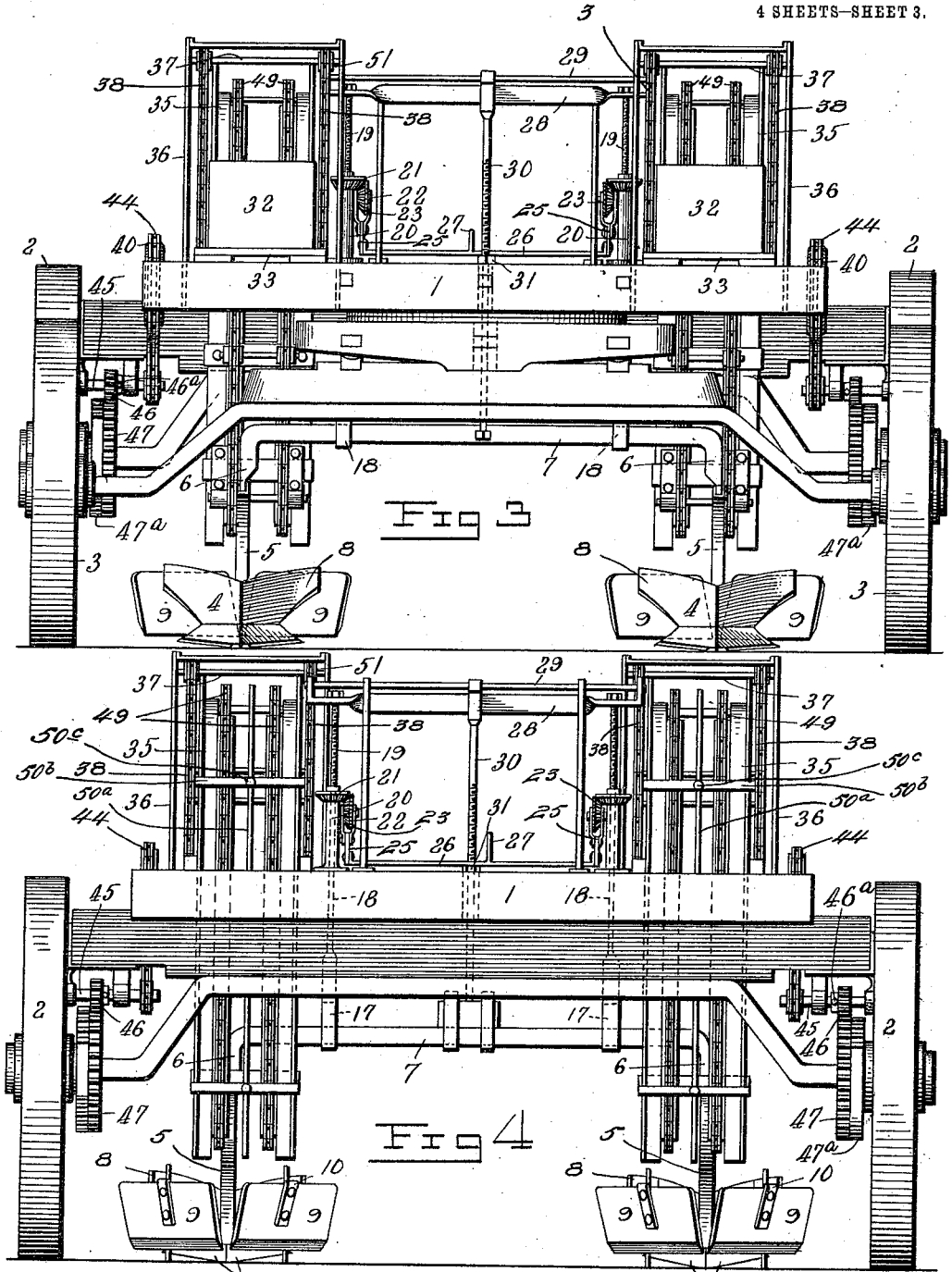
Witnesses
Inventor
Francisco Lojacono
by G. Ayres
Attorney

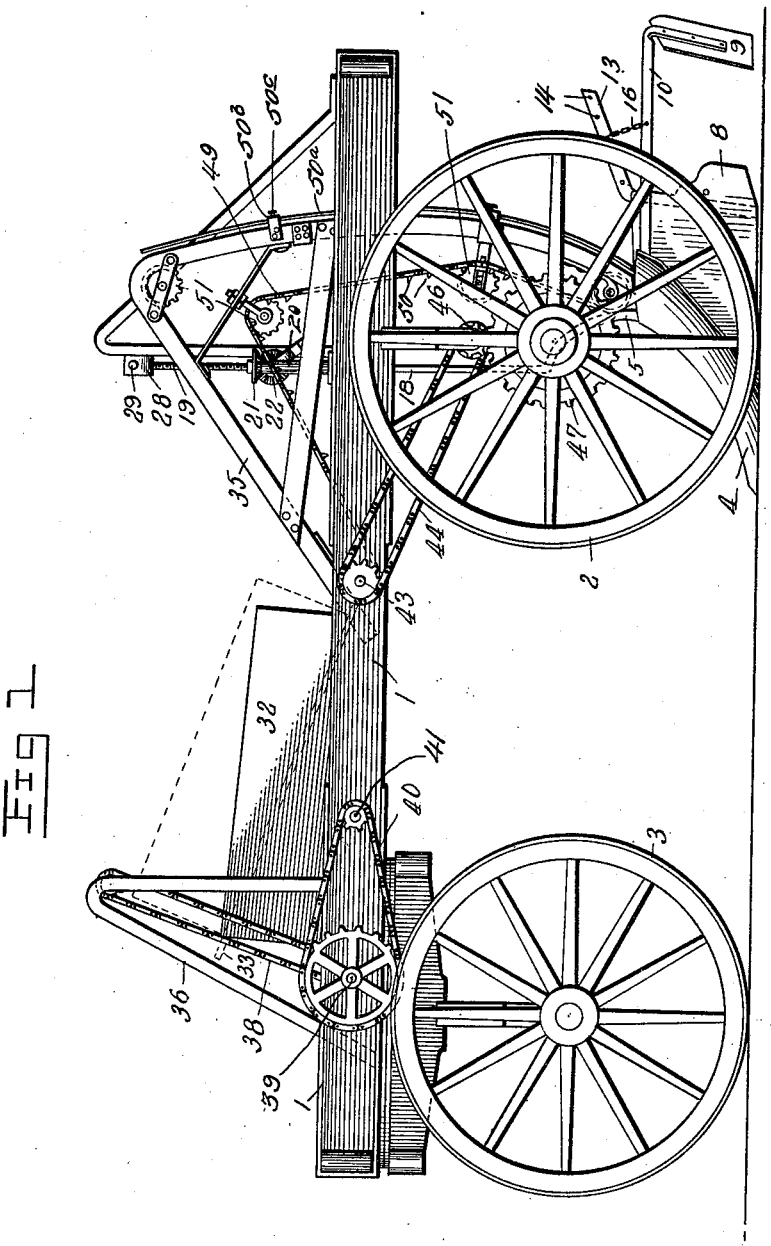

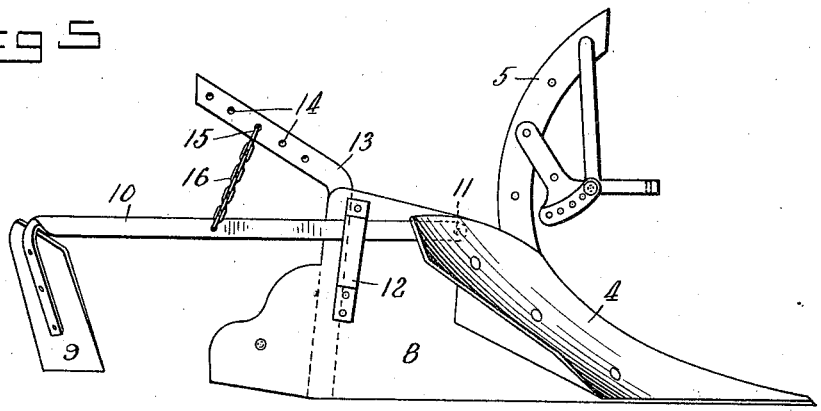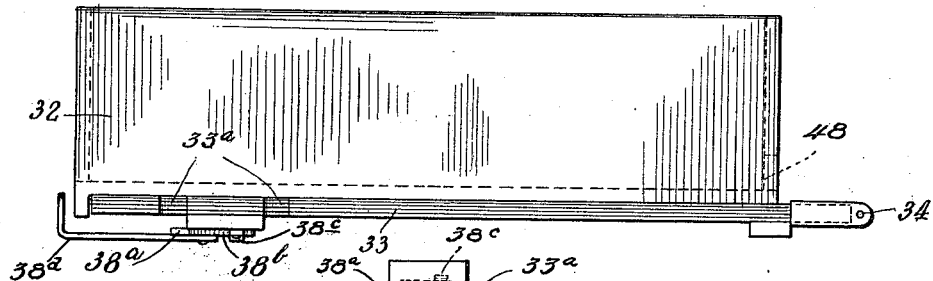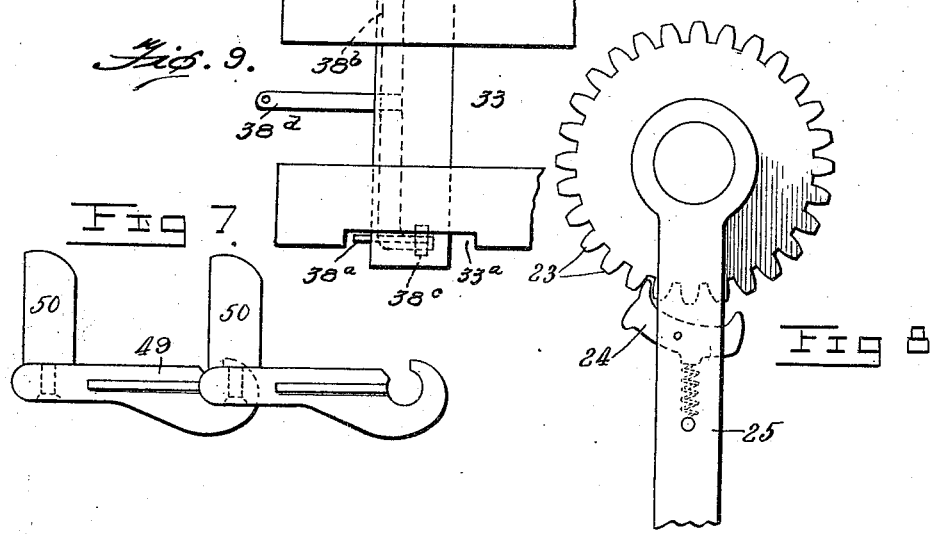

UNITED STATES PATENT OFFICE.

FRANCISCO LOJACONO, OF SAN JUAN, PORTO RICO.

SUGAR-CANE PLANTER.

1,000,529.  Specification of Letters Patent.  Patented Aug. 15, 1911.

Application filed November 9, 1910. Serial No. 591,441.

*To all whom it may concern:*

Be it known that I, FRANCISCO LOJACONO, a subject of the King of Italy, residing at San Juan, Porto Rico, have invented certain new and useful Improvements in Sugar-Cane Planters, of which the following is a specification.

My invention relates to sugar cane planters, and it consists in the construction, combination and arrangements herein described and claimed.

An object of my invention is to provide an improved cane planter adapted to operate efficiently with a greater capacity than has been possible in previous constructions.

A further object of my invention is to provide a strong and durable cane planter constructed for convenient operation under all conditions occurring in practice.

In the accompanying drawings, forming a part of this application and in which similar reference symbols indicate corresponding parts in the several views: Figure 1 is a side elevation illustrating one embodiment of my invention; Fig. 2 is a plan view of the construction shown in Fig. 1; Fig. 3 is a front elevation of the construction shown in Fig. 1; Fig. 4 is a rear elevation of the construction shown in Fig. 1; Fig. 5 is a detail elevation of the furrowing plow and its attached parts; Fig. 6 is an enlarged side elevation of the planter box mounted on its supporting frame; Fig. 7 is a fragmentary side elevation of the conveyer chain; Fig. 8 is a detail view of the ratchet wheel for vertically adjusting the furrowing plow, and Fig. 9 is a fragmentary plan view of the front end of the supporting frame shown in Fig. 6.

Referring to the drawings, 1 indicates the frame, or bed, of a wheel planter for sugar cane provided with the usual truck wheels 2 and 3.

A pair of furrow plows 4 are provided with arc-shaped arms 5 for securing them, as by bolts, to depending portions 6 on the ends of a cross bar 7. The plows are provided with rearwardly-extending mold boards 8 and with covering devices 9 carried by arms 10 pivoted at 11 to the plow. The mold boards 8 are provided with guides 12 for the swinging arms 10, and with inclined plates 13, provided with series of holes 14 for receiving hooks 15 of chains 16 secured to the arms 10; thereby providing convenient means for adjusting the covering devices relatively to the plows.

A cross bar 7 extends through slots 17 in a pair of supporting rods 18 provided with threaded upper portions 19 which extend freely through sleeves 20 bolted rigidly to the frame 1. Beveled wheels 21 are rotatably supported on top of the sleeves 20 in threaded engagement with the portion 19 of the rods 18. Beveled wheels 22 are journaled in the sleeves 20 in mesh with the wheels 21, and are provided with spur teeth 23 adapted to be actuated by spring pawls 24 pivoted on a pair or arms 25. The two arm 25 are rigidly connected by a rod 26 carrying a handle 27; thereby providing a common means for simultaneously raising or lowering the two supporting rods 18 for simultaneously adjusting the pair of plows 4 vertically. By disengaging one of the spring pawls 24, either of the supporting rods 18 can be independently adjusted to produce relative adjustment between the two plows 4.

The upper ends of the supporting rods 18 are connected by a plate 28 and bar 29, from which a stop rod 30 depends into engagement with the central portion of the cross bar 7. A stop nut 31 is adjustably threaded on the rod 30 for engaging the frame 1 to limit the downward movement of the cross bar 7, and its attached plows 4 at any predetermined point.

A pair of planter boxes 32 are supported on tiltable frames 33 which are pivoted at 34 to angle irons 35 constituting conveyer tracks.

Brackets 36 secured to the frame 1 carry spindles 37 actuatingly connected by sprocket chains 38 to spindles 39 journaled in the frame 1. As shown especially in Figs. 2, 6 and 9, the frames 33 are provided with slots 33ª for receiving the sprocket chains 38. A shiftable plate 38ᵇ is slidably mounted in guides 38ᶜ on the bottom of each frame 33, and provided with lugs 38ᵃ adapted to extend in the slots 33ª for engaging the sprocket chains 38 within said slots; the plate 38ᵇ being provided with a forwardly-extending handle 38ᵈ to provide convenient means for shifting said plate to throw the lugs 38ª into or out of engagement with the chains 38. The spindles 39 are driven by sprocket chains 40 from shafts 41, which latter are similarly actuated by sprocket chains 42 from rear shafts 43. The shafts 43 are driven by sprocket chains 44 from stub shafts 45 carrying shiftable pinions 46 adapted to mesh with spur wheels 47 and 47$^a$ secured to the hubs of the rear truck wheels 2. The wheels 47 and 47$^a$ can be formed with interrupted series of spur teeth arranged in any desired groups to provide for the required spacing between the planted cane sections for different characters of soil; the pinions 46 being splined on their stub shafts 45 and provided with set screws 46$^a$ for securing them in their several adjusted positions.

The rear ends of the planter boxes 32 are provided with open portions 48 for delivering cane joints therefrom onto the conveyer tracks 35, which latter are constructed to deliver cane joints between the mold boards 8 of the plows 4. Each conveyer track 35 is provided with a conveyer chain 49 having upstanding lugs 50 for carrying cane joints therealong; said conveyer chains being driven by sprocket wheels on the rear shaft 43 and guided by idle sprocket wheels 51 carried by the conveyer tracks 35.

In the operation of my invention, the planter boxes 32 are filled with cane joints, or sections, placed crosswise therein, and the plates 38$^b$ of the tiltable frames 33 shifted to throw the lugs 38$^a$ into engagement with the sprocket chains 38. Such engagement of the lugs 38$^a$ causes the planter boxes 32 to be gradually swung upward by the tiltable frames 33; thereby maintaining the cane joints at the open rear ends of said boxes, where they are presented successively to the traveling conveyer chains 49 until the entire supply in the boxes becomes exhausted. It will be seen that the proper rate of such upward swing of the planter boxes can be readily secured, as by properly porportioning the sprocket wheels on the spindles 39 and shafts 41. After the planter boxes have been thus tilted upward throughout their entire swing to discharge their contents, the plates 38$^b$ on the tiltable frames are shifted to release the lugs 38$^a$ from engagement with the sprocket chains 38; thereby permitting the planter boxes to be swung to their lowest positions to be refilled with cane joints. The lugs 38$^a$ are then again shifted into engagement with the sprocket chains 38, and above described operation repeated during the continued forward travel of the planter. The cane joints delivered successively from the open rear end of each planter box onto the pair of conveyer tracks 35 adjacent thereto are carried along said tracks by the upstanding lugs 50 of the conveyer chains 49; the cane joints being retained in position against the downwardly-extending portions of said tracks by a guide rod 50$^a$, which is supported from the tracks by brackets 50$^b$ and bolts 50$^c$ in position to engage the medial portions of the cane joints. As the conveyer chains 49 pass around the lower idle sprocket wheels 51 just above the plows, the cane joints are free to drop under the action of gravity into the furrows between the mold boards.

From the above description, it will be understood that my invention provides an improved sugar cane planter adapted to be operated efficiently by a single operator for simultaneously planting two or more rows of cane joints; thereby insuring a great saving of time and cost over the previous constructions which require the constant services of two operators for planting a single row of cane joints.

I have illustrated and described preferred and satisfactory constructions, but changes could be made within the spirit and scope of my invention.

Having thus described my invention, what I claim as new and desire to secure by Letters-Patent is:

1. In a cane planter, the combination of a planter box provided with an open portion for the removal of cane sections therefrom, and automatic means for swinging said box upwardly about such open portion, substantially as described.

2. In a cane planter, the combination of a planter box provided with an open portion, a conveyer for successively removing cane joints from such open portion, and means for actuating said conveyer and simultaneously swinging said box upwardly about its open portion, substantially as described.

3. In a cane planter, the combination of a planter box provided with an open portion, a conveyer for successively removing cane joints from such open portion, and a common drive mechanism for actuating said conveyer and simultaneously swinging said box upwardly about its open portion, substantially as described.

4. In a cane planter, the combination of a planter box provided with an open portion, a conveyer extending beneath such open portion, and means for actuating said conveyer and for swinging said box upwardly about its open portion, substantially as described.

5. In a cane planter, the combination of a planter box, provided with an open portion, tracks for receiving cane joints from such open portion, and means for successively conveying the cane joints along said tracks and simultaneously swinging said box upwardly about its open portion, substantially as described.

6. In a cane planter, the combination of independent planter boxes provided with open portions, independent conveyers for removing cane joints from such open portions, and means for swinging each box upwardly about its open portion and simultaneously actuating the corresponding conveyer, substantially as described.

7. In a cane planter, the combination of conveyer tracks, a planter box pivotally supported on said tracks for delivering cane sections to the latter, and means for successively conveying the cane sections along said tracks and simultaneously swinging said planter box about its pivotal support, substantially as described.

8. In a cane planter, the combination of a planter box provided with an open portion for the removal of cane sections therefrom, mechanism for swinging said box upwardly, and shiftable means for detachably engaging said mechanism to actuatingly connect said planter box thereto, substantially as described.

9. In a cane planter, the combination of a tiltable frame, a planter box supported thereon, mechanism for swinging said frame, and shiftable means carried by said frame for engaging said mechanism, substantially as described.

In testimony whereof I affix my signature in presence of two witnesses.

FRANCISCO LOJACONO.

Witnesses:
C. A. BAKER,
G. AYRES.

Copies of this patent may be obtained for five cents each, by addressing the "Commissioner of Patents, Washington, D. C."